Patented Dec. 14, 1937

2,102,380

UNITED STATES PATENT OFFICE 2,102,380

PROCESS OF CRYSTALLIZING PURE D-GLUCONO-DELTA-LACTONE

Richard Pasternack, Brooklyn, N. Y., assignor to Charles Pfizer & Company, Brooklyn, N. Y., a corporation of New Jersey No Drawing. Application March 23, 1934, Serial No. 717,112

9 Claims. (Cl. 260—123)

This invention relates to a process of preparing d-glucono-delta-lactone, and more particularly to a process of preparing pure d-glucono-delta-lactone from impure aqueous gluconic acid solutions.

One form of impure gluconic acid solution from which the lactone may be obtained is the crude fermentation liquor resulting from the gluconic acid fermentation of a glucose solution. This liquor may contain gluconic acid, salts of gluconic acid, sugars, nutrients, residues and by-products of the fermenting micro-organisms, and salts of inorganic bases such as aluminum, iron, magnesium, etc. When present in amounts less than their limits of solubility in the mother liquor, none of these impurities prevent the successful operation of the process, and lactone may be crystallized and substantially freed from mother liquor from solutions containing as much as 35% of glucose on the lactone basis.

Another source of impure gluconic acid is electrolytic liquors containing gluconic acid and/or calcium gluconate; the latter must be first filtered from the mother liquor, redissolved and treated with sulphuric acid to free gluconic acid, and filtered from the precipitated calcium sulphate. The solution will then contain a small amount of dissolved calcium sulphate and other inorganic salts. The calcium sulphate is removed by treatment with barium carbonate and oxalic acid in the known manner, and the solution is filtered from the precipitated barium sulphate and calcium oxalate.

The product will ordinarily consist to the extent of 90% or more of individual crystals, the balance being twins and aggregates. There will not be to any substantial extent, any interlacing or intergrowing of the crystals in groups giving granules of the so-called "cauliflower type". The crystals will be relatively large and readily purgible, and can be substantially completely freed from mother liquor. It will be obvious that such a process may be used to purify crude gluconic acid, and to prepare it for storage in a convenient anhydrous form.

U. S. Patent No. 1,862,511 discloses that d-glucono-delta-lactone may be crystallized from a concentrated aqueous solution of gluconic acid by seeding and evaporation under a vacuum. U. S. Patent No. 1,942,660, which is a continuation in part of No. 1,862,511, discloses that any temperature between 30° and 70° C. may be used, and that it is necessary to allow a certain minimum period of time for the crystallization, since if crystallization is too rapid, glucono-gamma-lactone and gluconic acid may be separated from solution along with the delta-lactone. When the content of impurities in the solution is small, the rate of crystallization of pure glucono-delta-lactone is conveniently rapid. In solutions of lower purity, the rate of crystallization of the lactone is diminished by the impurities present.

I have now found that in the presence of substances which increase the hydrogen ion concentration of the solution, the rate of crystallization of pure glucono-delta-lactone is increased and the viscosity of the mother liquor is decreased, and these effects are especially marked in the case of gluconic acid solutions which contain substantial amounts of impurities. The combined effect of these two actions is a more rapid and complete separation of crystalline delta-lactone from the solution in the form of larger crystals having less tendency to retain mother liquor. The crystals are also of a more compact and regular shape, that is they grow more uniformly along all three axes and do not show the usual tendency to become elongated and appear as needle crystals, and they are more uniform in size. The possibility of further growth of the crystals is also improved and the production of undesirable and relatively impurgible mixtures containing crystals of varying sizes is decreased by the conditions of my process. The production of compact and well grown crystals of relatively uniform size is especially important when the necessity for purification is present, since compact and well formed crystals have less tendency to include mother liquor, and crystals of relatively uniform size offer less resistance to the removal of mother liquor.

Increased hydrogen ion concentration improves the solubility of inorganic impurities such as alumina. Thus the magma, especially from a crude solution, is more fluid and the mother liquor is more easily removed from the crystals when the hydrogen ion concentration is higher. Since the retarding effect of the impurities is substantially reduced and crystallization greatly facilitated by the presence of comparatively minute proportions of acids stronger than gluconic acid, solutions so impure as to give only a small yield under ordinary conditions can be successfully worked by my process.

The crystallization of d-glucono-delta-lactone according to my process is promoted by the presence of any acid stronger than gluconic acid, but the various acids differ widely in effectiveness. I have found that the value of an acid for this purpose is roughly proportional to its effect in accelerating the change in specific rotation which takes place in any freshly-prepared aqueous solution of d-glucono-delta-lactone. Measurement of the rate of this change in the presence of a given acid is a convenient means of determining the value of such acid for the purposes of my invention.

The values in the following table were determined at about 22° C. The initial rotation is approximately $(\alpha)_D = 67°$.

| Elapsed time | I | II | III |
|---|---|---|---|
| | 20 g. delta-lactone made up to 100 cc. with— | | |
| | Water | 1% $H_2SO_4$ | 1% $H_2C_2O_4$ |
| | Degrees rotation, $(\alpha)_D$ | Degrees rotation, $(\alpha)_D$ | Degrees rotation, $(\alpha)_D$ |
| 4 min | | | 31.4 |
| 6 " | | | 26.7 |
| 7 " | | 11.5 | |
| 8 " | | | 22.5 |
| 9 " | 63.5 | 9.5 | 20.7 |
| 10 " | | | 18.9 |
| 12 " | | | 16.3 |
| 14 " | | | 13.5 |
| 15 " | | 8.4 | |
| 16 " | | | 11.8 |
| 18 " | 53.5 | | 10.5 |
| 20 " | | 8.4 | 10.0 |
| 22 " | | | 9.3 |
| 27 " | 44.0 | | |
| 30 " | | | 9.0 |
| 36 " | 34.6 | | |
| 40 " | 28.9 | 9.1 | |
| 50 " | 21.2 | 9.2 | |
| 60 " | 16.2 | 9.6 | |
| 70 " | 13.0 | | |
| 75 " | | 10.2 | |
| 80 " | 10.6 | | |
| 90 " | 10.0 | | |
| 40 hrs | | 16.7 | |

The table makes evident that 1% of sulphuric acid causes about the same rotation change in 9 minutes as occurs in aqueous solution not containing added sulphuric acid in the course of 90 minutes. With or without added acid, if sufficient time is allowed, a minimum rotation of about 8.3 is obtained, which on further standing increases due to formation of d-glucono-gamma-lactone. It will be seen that oxalic acid is about half as effective as the same weight of sulphuric acid. Other strong acids such as hydrochloric, trichloracetic, etc., may be used.

While the crystals of d-glucono-delta-lactone produced from an aqueous solution containing an acid stronger than gluconic acid are more uniformly developed than those from a solution not containing added acid, all are of the same crystal type; that is, they belong to the bipyramidal class of the orthorhombic system. d-glucono-delta-lactone crystallizes from alcohol in glistening leaflets which are of a different shape but belong to the same crystal system.

It will be understood that no theoretical explanation of the reasons for the effectiveness of my process is necessary, and I do not wish to be limited by theoretical considerations.

At 35° C. and in the presence of about 5.6% of its weight of sugars, 1% of its weight of protein and less than ½% of its weight of soluble inorganic substances, an aqueous solution of d-glucono-delta-lactone is saturated at a concentration of approximately 61% by weight. Above this concentration, separation of the crystallized lactone begins, and at a concentration of about 79% by weight of lacetone, a yield of about 45% of the lactone present may be obtained. In a sugar-free solution, the delta-lactone is soluble up to about 83% by weight. Any soluble impurities reduce the solubility of the delta-lactone, but a substantially pure product may be obtained by crystallization up to the point at which the concentration of the impurities exceeds their solubility in the remaining liquor.

In practice it is usual to start with a crude solution of the equilibrium mixture which forms at room temperature.

*Example*

A crude fermentation liquor is used in which the ratio of gluconic lactone to sugars is about 18 to 1, and the ratio of total organic and inorganic impurities to lactone is about 1 to 14. Add ½% of sulphuric acid on the lactone basis, concentrate to about 50% by weight of lactone, treat with decolorizing carbon and filter at 60 to 80° C. The filtered liquor is evaporated to a concentration of about 77% by weight of lactone at about 2″–4″ absolute pressure. The solution is then seeded with delta-lactone crystals and stirred without further evaporation at 32–40° C. for about 12 hours. In this manner a substantial crystallization of delta-lactone is obtained. This material has usually a sufficiently large grain for centrifuging. However, if a larger grain is desired it is not removed from the liquor but is reboiled under 1 to 2″ absolute pressure with continuous addition of enough more of the decolorized and filtered 50% lactone liquor to maintain a constant concentration of between 77 and 80% lactone. When a quantity of liquor equal to that of the original batch taken has been added, the grain is usually of considerably larger size than at first, but by further boiling with suitable addition of the 50% liquor, the grain size can be further increased. The reboiling operation ordinarily requires 4–6 hours. The final concentration is preferably about 79% lactone; the magma is then agitated without further evaporation at 33–43° C. for about 30 hours. The magma may be undercooled to 25° C. or lower without immediate separation of gluconic acid, and even in the presence of gluconic acid seeds, the conversion of delta-lactone to gluconic acid is very slow. The crystals are now removed from the mother liquor in the known manner, for instance by centrifugation, and washed with water until free of mother liquor. The washed and still moist lactone should not be exposed for any length of time to a temperature below 30° C. because hydration to gluconic acid often takes place. This may crystallize in solid form and is then difficult to reconvert to delta-lactone by subsequent drying. In this way, about 45% of the contained lactone is obtained in substantially pure form.

The same method of crystallization is then repeated on the mother liquor, except that the optimum concentration becomes less with each successive crystallization, owing to the increasing ratio of impurities to lactone present. Upon a second crystallization, a yield of about 45% of the lactone present may be obtained by concentrating to about 75% by weight of lactone, and for the third crystallization a concentration of about 69% by weight is favorable. With a liquor containing 7% of total impurities on the lactone basis, it is possible to obtain 80% of the lactone in pure form. The final mother liquor may be diluted, freed from heavy metals (such as copper and iron) and sulphuric acid, and then subjected to yeast fermentation to remove sugars. It will then yield further quantities of lactone, and in all about 95% of the contained lactone can be recovered.

It is also feasible to remove sugar from the original liquor by yeast fermentation.

While ½% of sulphuric acid on the lactone basis is sufficient for practical purposes, quantities as high as 10% may be used, and in the case of weaker acids such as oxalic acid, proportionately greater amounts are permissible; but the accelerating effect of the added acid is not proportionately increased when larger quantities are used.

I claim:

1. Process of preparing pure d-glucono-delta-lactone from aqueous gluconic acid solutions resulting from the gluconic acid fermentation of glucose, comprising over-saturating the solution in the presence within the solution of a minor proportion of an acid stronger than gluconic acid, and crystallizing d-glucono-delta lactone at 30–70° C. from the acidified solution.

2. Process of preparing pure d-glucono-delta-lactone from aqueous gluconic acid solutions resulting from the gluconic acid fermentation of glucose, comprising over-saturating the solution in the presence within the solution of a minor proportion of an acid stronger than gluconic acid, and crystallizing d-glucono-delta-lactone at about 40° C.

3. Process of crystallizing d-glucono-delta-lactone from aqueous solution in the presence of about ½% of sulphuric acid on the lactone basis.

4. In the process of preparing d-glucono-delta-lactone from aqueous gluconic acid solutions resulting from the gluconic acid fermentation of glucose, the step of accelerating the formation and improving the crystallization of the delta lactone by increasing the hydrogen ion concentration of the solution through the addition of a minor proportion of an acid stronger than gluconic acid.

5. Process of preparing d-glucono-delta-lactone in improved crystalline form, comprising crystallizing d-glucono-delta-lactone from aqueous solutions in the presence within the solution of a minor proportion of an acid stronger than gluconic acid.

6. Method of producing purgible crystals of d-glucono-delta-lactone from aqueous solutions which comprises keeping the solution at a crystallizing supersaturation in the presence within the solution of a minor proportion of an acid stronger than gluconic acid, and at a temperature between 30–70° C.

7. In the process of preparing d-glucono-delta-lactone from aqueous gluconic acid solutions, the step of accelerating the formation and improving the crystallization of the delta lactone by increasing the hydrogen ion concentration of the solution through the addition of an acid stronger than gluconic acid in an amount sufficient to produce a hydrogen ion concentration substantially equal to that produced by the addition of ½% to 10% of sulfuric acid.

8. Process of crystallizing d-glucono-delta-lactone from aqueous gluconic acid solutions in the presence of from about ½% to about 20% on the lactone basis of an acid stronger than gluconic acid.

9. Process of crystallizing d-glucono-delta-lactone from aqueous gluconic acid solutions in the presence of from about ½% to about 10% on the lactone basis of an acid stronger than gluconic acid.

RICHARD PASTERNACK.